(12) United States Patent
Jones

(10) Patent No.: US 7,930,524 B1
(45) Date of Patent: *Apr. 19, 2011

(54) METHOD FOR EXECUTING A 32-BIT FLAT ADDRESS PROGRAM DURING A SYSTEM MANAGEMENT MODE INTERRUPT

(75) Inventor: Stephen E. Jones, Bellevue, WA (US)

(73) Assignee: Phoenix Technologies Ltd., Milpitas, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/247,158

(22) Filed: Oct. 7, 2008

Related U.S. Application Data

(63) Continuation of application No. 09/930,106, filed on Aug. 14, 2001, now Pat. No. 7,444,500.

(60) Provisional application No. 60/225,130, filed on Aug. 14, 2000.

(51) Int. Cl.
 *G06F 7/38* (2006.01)
 *G06F 9/00* (2006.01)
 *G06F 9/44* (2006.01)

(52) U.S. Cl. ......... 712/228; 712/229; 712/232; 712/244

(58) Field of Classification Search .................. 712/228, 712/229, 232, 244
 See application file for complete search history.

(56) References Cited

U.S. PATENT DOCUMENTS 5,832,299 A    11/1998    Wooten

*Primary Examiner* — Alford W Kindred
*Assistant Examiner* — Jesse R Moll
(74) *Attorney, Agent, or Firm* — Christopher J. Brokaw

(57) ABSTRACT

A method and system for executing 32-bit flat address programs during a System Management Interrupt. The system provides a 16-bit SMI routine that is given control when an SMI occurs. That routine initially saves the state of the processor and then executes an instruction to switch to protected mode. When in protected mode, the routine transfers control to 32-bit code. The 32-bit code uses a global descriptor table that is different from that used by the interrupted operating system. When the 32-bit code completes, it restores the saved processor state and returns from the interrupt by executing an RSM instruction.

23 Claims, 1 Drawing Sheet

US 7,930,524 B1

METHOD FOR EXECUTING A 32-BIT FLAT ADDRESS PROGRAM DURING A SYSTEM MANAGEMENT MODE INTERRUPT

CROSS-REFERENCE TO RELATED APPLICATION

This application is a continuation of U.S. patent application Ser. No. 09/930,106, filed Aug. 14, 2001, now U.S. Pat. No. 7,444,500 which claims the benefit of U.S. Provisional Patent Application No. 60/225,130, filed Aug. 14, 2000. application Ser. Nos. 60/225,130 and 09/930,106 are incorporated herein by this reference.

TECHNICAL FIELD

The described technology relates generally to a technique for executing a program during a system management mode interrupt.

BACKGROUND

The Intel Pentium processor (and other similar similar-class processors such as those from AMD, National Semiconductor, and ST Microelectronics) and its successors can run in three different operating modes: real mode, protected mode, and System Management Mode (SMM). (The architecture of the Pentium processor is described in "Pentium Processor Users Manual, Volume 3: Architecture and Programming Manual," dated 1993 and published by Intel Corporation, which is hereby incorporated by reference.) Real mode has been used for operating systems like DOS and provides a memory architecture that supports up to 1 MB (megabyte) of address space. Protected mode is used by operating systems such as Linux and Windows NT, supporting a much larger address space of at least 4.2 GB (gigabyte) and offering the capability of fetching 32-bit processor instructions from addresses beyond the 1 MB address boundary. SMM is a special "invisible" mode of the processor that supports a limited amount (128 KB, typically) of address space below 1 MB for fetching 16-bit processor instructions. Additionally SMM can support data references throughout the entire 4.2 GB address space. However, SMM is limited because it does not allow code to be executed when it is positioned above the 1 MB boundary, making it impractical for use in running large or many applications. Further, those applications are limited to 16-bit operation, not flat 32-bit operation. Whether the processor is in real mode or protected mode, external circuitry can cause the processor to execute a special SMM Interrupt (SMI). When an SMI occurs, the operating system that is running is suspended and the SMI routine runs in a manner that is transparent to the operating system. This SMM was developed by the hardware manufacturers to enable power-management software to run transparently to the operating system. The SMM provides a small amount of RAM (128K typically) for use by the SMI routine. This memory is only mapped into an address space when in SMM. Also, while in SMM, the processor executes with real-mode addressing rules that are extended by making it possible to access memory beyond 1 MB with addressing and size overrides on each instruction. In other words, the SMI routine does not run as flat 32-bit code, which means that 16-bit code needs to be used for the SMI routine.

DETAILED DESCRIPTION

Figure 1:
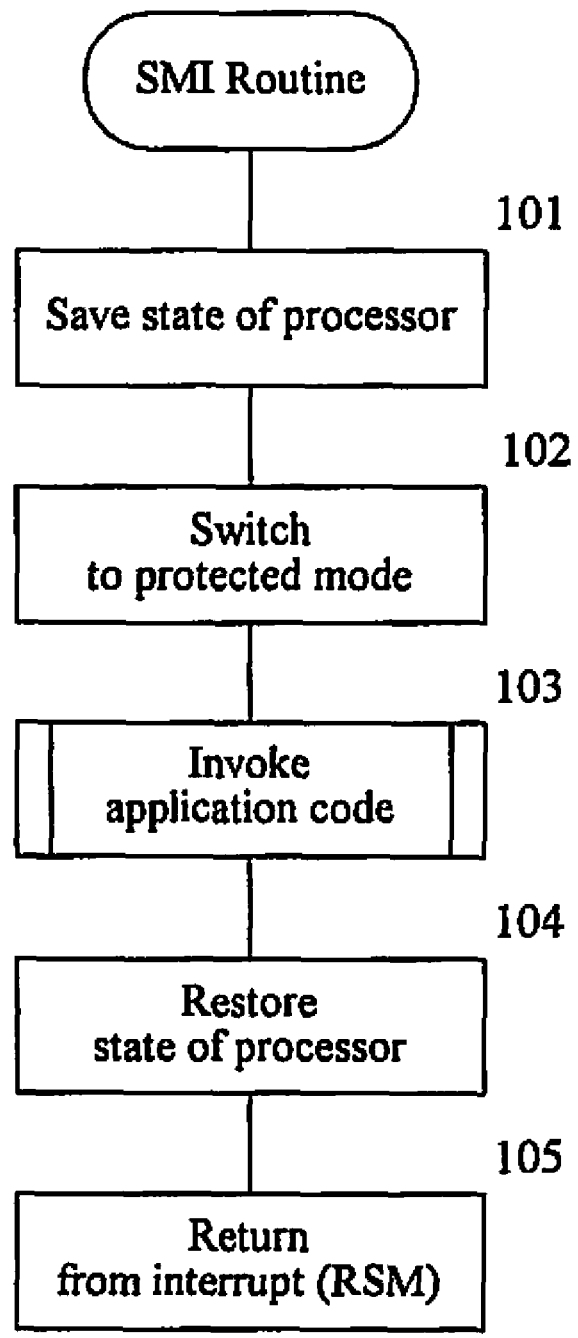
FIG. 1 is a flow diagram illustrating the processing of the SMI routine's transition all the way to the 32-bit flat address mode environment.

A method and system for executing 32-bit flat address programs during a System Management Interrupt is provided. In one embodiment, the SMM technique provides a 16-bit SMI routine that is given control when an SMI occurs. That routine initially saves the state of the processor and then executes an instruction to switch to protected mode. When in protected mode, the routine transfers control to 32-bit code. The 32-bit code uses a global descriptor table ("GDT") that is different from that used by the interrupted operating system. When the 32-bit code completes, it restores the saved processor state and returns from the interrupt by executing an RSM ("Resume from System Management mode") instruction.

In one embodiment, the SMI routine invokes a 32-bit operating system kernel that is developed using standard 32-bit Windows development tools. This kernel may be loaded into SMM memory by the BIOS during system initialization. SMIs are caused to occur periodically (e.g., every 16 milliseconds) by programming the power management timers on external control circuitry implemented in the "chipset" components on the motherboard. An SMI is generated when an SMI input line to the processor is set by the chipset. The 16-bit SMI routine loaded from the BIOS receives control when these SMIs occur, saves the processor state, switches into 32-bit flat protected mode, and transfers control to a 32-bit operating system kernel. The kernel runs entirely in 32-bit protected mode, and is capable of loading and running standard Windows NT Portable Executable programs within the SMI context. (Of course. these programs would typically only use APIs ("Application Program Interface") provided by the proprietary 32-bit kernel.) The 32-bit code executed during an SMI can run programs transparently to the foreground operating system and can run them even while the foreground operating system has crashed or stopped responding (e.g., Linux Panic, or Windows NT Blue Screen). This SMM technique enables various applications to be developed to execute during an SMI. The applications may include a remote console, remote boot, remote diagnostics, remote restart, and debugging.

FIG. 1 is a flow diagram illustrating the processing of the SMI routine's transition all the way to the 32-bit flat address mode environment. In block 101, the routine saves the state of the processor, which may include the saving of the floating point register. In block 102, the routine switches to protected mode by initializing the Global Descriptor Table Register ("GDTR") to point to a new GDT, setting a bit in the processor's CR0 ("Control Register 0") register to switch to protected mode, and finally loading segment registers with protected mode selectors mapped as 32-bit segments by the new GDT. In block 103, the routine transfers control to the 32-bit application code by a NEAR CALL instruction to the preloaded 32-bit kernel dispatcher entrypoint. In block 104, the routine restores the saved state of the processor. In block 105, the routine returns from the interrupt by executing the RSM instruction.

In one embodiment, the BIOS ("Basic Input Output System") would preload the 32-bit SMM kernel into SMRAM and/or other physical memory reserved for SMM activities early on during Power On Self Test (POST). The kernel would be retrieved from a compressed bit stream stored in the same Flash ROM as the BIOS, to minimize its impact on the overall size of the firmware footprint in the system. Any 32-bit flat address programs that would need to run in the environment would also be stored as compressed bit streams stored in the same Flash ROM or another Flash. ROM in the system, and be subsequently loaded by the 32-bit kernel once it had received control in System Management Mode via an SMI.

In one embodiment, the SMM kernel would not have detailed knowledge of the programming of the chipset hardware (i.e., PIIX4 in the case of a Pentium II or Pentium III processor) in order to receive control via an SMI or dismiss the reason for the SMI at the hardware, since the mechanism for doing that is chipset dependent. The implementation would have this chipset programming (which both programs the chipset to generate SMIs on certain conditions and can dismiss those conditions at the hardware) handled by a Hardware Abstraction Layer (HAL), implemented outside the 32-bit SMM environment. This HAL would be implemented in two parts: the chipset programming itself, and the dispatching 16 bit-SMIs to the 32-bit SMM kernel. In an implementation, the SMM manager component provides the dispatching functions, and the Chipset Personality Module (CSPM) provides the actual hardware programming functions. The SMM manager calls certain CSPM functions in order to perform SMI control programming on its behalf, making the details of the underlying hardware transparent to the SMM manager (and therefore the core BIOS) and the 32-bit SMM kernel and its applications.

Based on the above description it will be appreciated that, although various embodiments have been described for purposes of illustration, various modifications may be made without deviating from the spirit and scope of the invention. Accordingly, the invention is not limited except as by the appended claims.

The invention claimed is:

1. A method in a computer system having a global descriptor table register for executing code during a system management mode interrupt (SMI), the method comprising:
   responsive to an occurrence of the SMI, saving state of the computer system;
   switching the computer system to protected mode;
   further responsive to the occurrence of the SMI, replacing first contents of the global descriptor table register that point to a first global descriptor table in use when the system management mode interrupt occurred with second contents that point to a second global descriptor table that is distinct from the first global descriptor table;
   still further responsive to the occurrence of the SMI, executing a plurality of 32-bit instruction codes using the second global descriptor table; and
   still further responsive to the occurrence of the SMI, restoring the saved state of the computer system, and exiting system management mode by returning from the occurrence of the SMI.

2. The method of claim 1 wherein the plurality of 32-bit instruction codes operate to load programs during the occurrence of the system management mode interrupt.

3. The method of claim 2 wherein the programs are conform to the Portable Executable (PE) file format standard.

4. The method of claim 1 wherein the 32-bit instruction codes are selected from a group consisting of a remote console program, a remote boot program, a remote diagnostics program, a remote restart program and a debugging program.

5. The method of claim 1 wherein the computer system has a foreground operating system, and wherein the 32-bit instruction codes execute transparently to the foreground operating system.

6. The method of claim 1 wherein the computer system has a foreground operating system, and wherein the 32-bit instruction codes execute after the foreground operating system has crashed or stopped.

7. The method of claim 1 wherein the computer system has a foreground operating system, and wherein the 32-bit instruction codes execute when the foreground operating system crashes or stops.

8. The method of claim 1 wherein the 32-bit instruction codes are loaded into memory from a ROM.

9. The method of claim 1 wherein the 32-bit instruction codes are loaded into memory from a Flash ROM.

10. The method of claim 1 wherein a processor switches to system management mode and executes an SMI routine in response to a signal received on an input line of the processor.

11. The method of claim 10 wherein the input line is an SMI input line.

12. The method for claim 1 wherein a processor switches to a system management mode and executes an SMI routine in response to a message received via a front side bus of the processor.

13. The method of claim 1 wherein a processor chip set is the source of the SMI.

14. The method of claim 1 wherein a Northbridge controller is the source of the SMI.

15. The method of claim 1 wherein a Southbridge controller is the source of the SMI.

16. The method of claim 1 wherein returning from the occurrence of the interrupt is accomplished by executing an RSM instruction.

17. A system comprising:
   a processor;
   a global descriptor table register for pointing to tables comprising descriptors for executing code; and
   a component to respond to a system management mode interrupt (SMI) by causing the processor to perform the acts of:
   storing a register state comprising an initial processor mode;
   entering a system management mode (SMM);
   executing first instruction codes to
      save a state of the processor;
      switch the processor to a protected mode;
      replace first contents of the global descriptor table register that point to a first global descriptor table in use when the SMI occurred with second contents that point to a second global descriptor table that is distinct from the first global descriptor table;
      transfer control to a plurality of 32-bit instruction codes enabled by the second global descriptor table;
      restore the saved state of the processor; and
      leaving SMM by executing further instruction codes to use the stored register state to restore the initial processor mode.

18. The system of claim 17 further comprising executing an operating system kernel for loading and running programs responsive to receiving the SMI.

19. The system of claim 17 wherein the 32-bit instruction codes are selected from a group consisting of a remote console program, a remote boot program, a remote diagnostics program, a remote restart program, and a debugging program.

20. The system of claim 17 wherein the computer system has a foreground operating system, and wherein the 32-bit instruction codes execute transparently to the foreground operating system.

21. The system of claim 17 wherein the system has a foreground operating system, and wherein the 32-bit instruction codes execute before and after the foreground operating system crashes or stops.

22. The system of claim 17 wherein the system returns an SMI routine by executing an RSM instruction.

23. A computer-readable storage medium encoded with instruction codes for executing responsive to a system management mode interrupt (SMI) that, when executed by a processor comprised within a system having a global descriptor table register, cause the system to:
- switch the system to a protected mode;
- replace first contents of the global descriptor table register that point to a first global descriptor table in use when the system management mode interrupt occurred with second contents that point to a second global descriptor table that is distinct from the first global descriptor table;
- execute a plurality of 32-bit instruction codes using the second global descriptor table; and
- restore the saved state of the computer system, and exit system management mode by returning from the occurrence of the SMI.

* * * * *